(12) United States Patent
Jain

(10) Patent No.: US 7,332,017 B2
(45) Date of Patent: Feb. 19, 2008

(54) METHOD AND APPARATUS FOR SEPARATION OF MOISTURE FROM FLUIDS

(75) Inventor: Ravi Jain, Bridgewater, NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 379 days.

(21) Appl. No.: 10/948,859

(22) Filed: Sep. 24, 2004

(65) Prior Publication Data
US 2006/0065117 A1 Mar. 30, 2006

(51) Int. Cl.
*B01D 53/22* (2006.01)

(52) U.S. Cl. .................. 95/52; 95/45; 95/117; 95/122; 95/126; 95/148; 96/4; 96/144; 96/146

(58) Field of Classification Search .................... 95/43, 95/45, 46, 117, 126, 52, 148, 99, 97, 11, 26, 95/118, 119, 120, 121, 122, 123, 124, 125; 96/4, 6, 7, 8, 9, 10, 11, 12, 14, 144, 143, 111, 96/115, 131, 133, 121, 146
See application file for complete search history.

(56) References Cited

U.S. PATENT DOCUMENTS

| | | | | |
|---|---|---|---|---|
| 5,034,025 A | * | 7/1991 | Overmann, III | 95/52 |
| 5,205,842 A | * | 4/1993 | Prasad | 95/47 |
| 5,240,472 A | * | 8/1993 | Sircar | 95/52 |
| 5,242,473 A | * | 9/1993 | Ogasahara | 96/125 |
| 5,383,956 A | * | 1/1995 | Prasad et al. | 95/45 |
| 5,632,802 A | * | 5/1997 | Grgich et al. | 95/10 |
| 5,669,962 A | * | 9/1997 | Dunne | 95/115 |
| 6,027,546 A | * | 2/2000 | Kusters et al. | 95/52 |
| 6,361,585 B1 | * | 3/2002 | Anzai et al. | 95/113 |
| 6,364,942 B1 | * | 4/2002 | Felber et al. | 96/111 |
| 6,428,608 B1 | * | 8/2002 | Shah et al. | 95/123 |
| 6,532,715 B2 | * | 3/2003 | Reinke et al. | 52/745.21 |
| 6,652,628 B1 | * | 11/2003 | Hess | 95/113 |
| 6,955,704 B1 | * | 10/2005 | Strahan | 95/8 |
| 2002/0139245 A1 | * | 10/2002 | Kesten et al. | 95/52 |
| 2002/0157535 A1 | * | 10/2002 | Kanazirev et al. | 95/96 |
| 2003/0089227 A1 | * | 5/2003 | Hasse et al. | 95/45 |
| 2004/0173095 A1 | * | 9/2004 | Vierling | 95/99 |

\* cited by examiner

*Primary Examiner*—Duane Smith
*Assistant Examiner*—Robert A Clemente
(74) *Attorney, Agent, or Firm*—David A. Hey

(57) ABSTRACT

Apparatus and methods useful for removal or reduction of moisture from fluids are described. In one embodiment the apparatus comprises a moisture separation unit comprising a thermally regenerable moisture adsorption material having feed and waste sides, and means for regenerating the thermally regenerable moisture adsorption material. The feed fluid contacts the feed side, while a dry, preferably heated purge gas flows past the waste side. The thermally regenerable moisture adsorption material is regenerated by contacting with the heated dry purge gas. The apparatus and methods are particularly useful in supplying dehydrated electronic specialty gases to semiconductor tools.

55 Claims, 2 Drawing Sheets

METHOD AND APPARATUS FOR SEPARATION OF MOISTURE FROM FLUIDS

BACKGROUND OF THE INVENTION

1. Field of the Invention

The invention is generally related to the field of fluid/fluid separation. More specifically, the invention relates to apparatus and methods for separation of moisture from fluids using a thermally regenerable material.

2. Related Art

Moisture, despite its necessity for sustaining life, is a prime enemy in many industries. The semiconductor fabrication industry is no exception. In fact, there are sophisticated heating (known in the semiconductor art as baking) methods used to dehydrate metal containers and tubing that are exposed to electronic specialty gases used to produce integrated circuits and other devices, such as flat panel displays. Baking is sometimes used in conjunction with granular beds, such as soda lime, sodium fluoride, heat activated aluminum oxide, finely divided nickel, or combination thereof. Soda lime (a mixture of calcium oxide with sodium hydroxide or potassium hydroxide), is typically used as an absorbent for carbon dioxide and water vapor. The use of granular bed such as soda lime, however, has the disadvantage of removing some of the usable gas. For example, HF is believed to react with calcium oxide to form calcium fluoride.

U.S. Pat. No. 5,030,251 discloses a system for separating a portion of a first gas (typically water vapor) from a gaseous feed (typically moist air) comprising a mixture of gases that is intermittently supplied to the system. While the patent is written in broad terms, the emphasis is placed on removal of water from air. According to the inventors of this patent, conventional membrane separators are quite effective during continuous (steady state) operation, but when the feed is supplied intermittently the system is often not as effective due to the fact that some residual water vapor remains in the separator when flow through the separator is stopped. When the flow is restarted, the residual water vapor flows out with the non-permeate product rather than permeating the membrane sidewalls. Thus, the non-permeate product exiting the separator during restart is not as dry as product exiting the separator during steady state operation. Therefore, in a system in which feed to the membrane separator is frequently cycled on and off, the membrane separator loses effectiveness. The system and method for treating feeds that are intermittently supplied described in the 251 patent comprises a membrane gas separator having at least one membrane through which the first gas permeates preferentially in comparison to other gases contained in the mixture. The separator is adapted to produce a non-permeate gaseous product which is discharged from a non-permeate gas side of the separator and in which the concentration of the first gas is lower than in the feed mixture. The system also includes a mechanism for supplying a gaseous purge stream to the separator when the feed mixture is not being supplied to the system. The concentration of the first gas is lower in the gaseous purge stream than in the feed mixture to purge residual amounts of the first gas contained in the membrane of the separator.

U.S. Pat. No. 5,160,511 discusses materials permeable to water vapor, including polymers of perfluoroethylene sulphonic acid that are available under the trade name "Nafion", from E. I. DuPont de Nemours, which have the property of being freely permeable to the passage of water vapor but almost impermeable to nearly all other gases and vapors. Tubing and membranes made of this material are therefore used to add or remove water vapor from gas mixtures or from flowing stream of gas mixtures. The 511 patent notes one disadvantage of such a perfluoroethylene sulphonic acid polymer is that it is a very strong acid and somewhat unstable to heat, and resolves this problem by providing a membrane permeation unit comprising a perfluorocarbon polymer with lithium sulphate groups covalently bonded to at least a portion of the carbon skeleton, formed for example by immersing a polymer of perfluoroethylene sulphonic acid in a lithium hydroxide solution. A dehydrating unit utilizes this polymer as the separation means, as well as a dry gas (dry air) flowing on the permeate side of the membrane. There is no teaching or suggestion of means for regenerating the polymer, or use of these membranes in combination with other moisture removal materials.

U.S. Pat. No. 5,205,842 discloses a moisture removal system using a first or roughing stage to remove the bulk of moisture and a second or polishing stage to complete the drying. According to the 842 patent, the first stage can use a relatively small membrane area and a relatively low quality purge gas whereas the second stage can use a large membrane area and high quality purge gas, such as some product back purge. The 842 patent arrangement claims to provide efficient usage of available high quality purge gas, such as product, while minimizing product contamination, and the two stage purging arrangement is said to be especially attractive for those processes or systems where multigrade purge gases are available. The reference does not teach or suggest use of thermally regenerable moisture adsorption materials.

U.S. Pat. No. 5,641,337 discloses a process for the dehydration of a gas, particularly of a gas such as natural gas where the gas values should all be substantially recovered as dehydrated gas, in contrast to previous systems which wasted much of the usable gas. The process uses membrane dryers and provides a sweep gas for each of the dryers, where the sweep gas is substantially recovered and used again as a sweep gas. The process is stated to be economical for dehydration of large quantities of gas. Patents cited relating to dehydration of natural gas by use of membrane systems include U.S. Pat. Nos. 3,735,558; 4,497,640; and 4,718,921.

U.S. Pat. No. 6,709,487 discloses use of an adsorbent, method, and apparatus involving same for the removal of moisture from a fluoride-containing fluid such as gaseous nitrogen trifluoride. The adsorbent comprises an organic support such as polytetrafluoroethylene and at least one metal fluoride disposed within at least a portion of the organic substrate. The adsorbent may be regenerable or reused because the hydrated metal fluoride can be dissociated at an elevated temperature.

Despite improvements in the art, the need remains for apparatus and methods to efficiently and safely separate moisture from fluids, especially in the presence of fluids commonly used in the semiconductor and flat panel display fabrication industries. Fluids used in this industry include reactive gases such as HF, $AsH_3$, HCl, $NF_3$, $O_3$, $Cl_2$, $Fl_2$, silane and its derivatives, as well as relatively inert compounds such as perfluorocompounds (PFCs), nitrogen, argon and fluids comprising a combination of moisture, inert and reactive gases. The need is especially acute when these fluids are required on a continuous basis by a semiconductor or flat panel display fabrication facility.

SUMMARY OF THE INVENTION

In accordance with the present invention, apparatus and methods of use are presented which reduce or overcome many of the problems of previously known moisture removal apparatus and methods.

A first aspect of the invention relates to an apparatus useful for separation of moisture from a fluid, the apparatus comprising:

a) a moisture separation unit comprising a feed fluid inlet, a product outlet, a dry purge gas inlet, a waste outlet, and a thermally regenerable moisture adsorption material having feed (non-permeate) and waste (permeate) sides, preferably a polymeric or inorganic membrane, preferably comprising the polymer known under the trade designation Nafion, a feed fluid being adapted to contact the non-permeate side;

b) the moisture separation unit having a passage for allowing a dry purge gas to flow near the waste side of the thermally regenerable moisture adsorption material while the feed fluid is contacting the feed side of the material; and c) means for regenerating the thermally regenerable moisture adsorption material.

Apparatus of the invention are preferably modular, and more preferably portable, so that the apparatus may be installed in one location and then transferred to another location, either in the same plant, or different plant. Other preferred apparatus are those wherein the thermally regenerable moisture adsorption material is a thermally regenerable moisture adsorption membrane; apparatus wherein the membrane is selected from the group consisting of organic membranes and inorganic membranes wherein the inorganic membrane is selected from the group consisting of zirconia, alumina, titanium dioxide, $BaTiO_3$, and combinations thereof; apparatus wherein the thermally regenerable moisture adsorption organic membrane is a synthetic polymeric membrane; apparatus wherein the synthetic polymeric membrane comprises perfluoroethylene sulphonic acid polymer.

Other preferred apparatus of the invention are those wherein the moisture adsorption unit is adapted to operate alternatively in a moisture adsorption mode and a regeneration mode; comprising n moisture separation units all fluidly connected in parallel to receive feed fluid on the feed side and each fluidly connected to receive dry purge gas on the waste side, where n ranges from 2 to an unlimited number; including valving sufficient to allow at least one moisture separation unit to operate in adsorption mode and at least one moisture adsorption unit to operate in regeneration mode.

Yet other preferred apparatus of the invention are those wherein the thermally regenerable membrane has a form selected from the group consisting of flat sheet, hollow fiber, tubular, spiral wound, vortex, pleated sheet and tube ribbon form, and the membranes may be the same or different in composition, diameter, and orientation.

Another apparatus embodiment of the invention is a combination of the apparatus of the first aspect with a second moisture separation unit. This apparatus is useful when the feed fluid has more than about 1000 ppm of moisture. The second moisture separation unit may be identical to the unit of the first aspect of the invention, or may not include a thermally regenerable moisture adsorption material. Preferably the second moisture separation unit is positioned upstream of the first unit, that is, the feed fluid is first contacted with the moisture adsorption material in the first moisture adsorption unit to produce an intermediate product fluid having reduced moisture content relative to the feed fluid. The intermediate product then flows into one or a plurality of moisture removal units of the first aspect of the invention. If there are a plurality of units, the intermediate product fluid may flow either into one unit operating in adsorption mode while the others are in regeneration mode, or all of the units may be in adsorption mode operating in parallel. In the latter case, the dry purge gas may be heated or not heated. While the feed fluid contacts the first moisture adsorption material and the intermediate product fluid contacts the thermally regenerable material, dry purge gas first enters the unit of the first aspect of the invention and contacts the waste side of the thermally regenerable moisture adsorption material, exits after picking up some transferred moisture, and proceeds to the waste side of the non-thermally regenerable moisture separation unit, where additional moisture is transferred to the purge gas. The wet purge gas then exits the unit, either to a purge gas recovery unit, or to waste.

A second aspect of the invention are methods for removal or reduction of moisture in a fluid, one method comprising the steps of:

a) flowing a feed fluid including moisture on the feed side of an apparatus of the first aspect of the invention to form a dehydrated product stream; and b) flowing a dry, heated purge gas on the waste side of the moisture separation unit of the first aspect of the invention to transfer moisture to the dry, heated purge gas and regenerate the moisture adsorption material. Preferably steps (a) and (b) occur simultaneously and continuously. In this embodiment it can be seen that adsorption mode and regeneration mode may occur simultaneously.

Another method embodiment comprises the steps of:

a) flowing a feed fluid comprising moisture on the feed side of an apparatus of the first aspect of the invention to form a dehydrated product stream;

b) flowing a dry, non-heated purge gas on the waste side of the moisture separation unit of the first aspect of the invention to transfer moisture to the dry, non-heated purge gas, the dry purge gas preferably at about the same temperature as the feed fluid in step (a);

c) stopping the flow of feed fluid to the moisture separation unit after a set time period or after the moisture removal material becomes laden with moisture; and d) flowing heated dry purge gas past the waste side of the thermally regenerable material to regenerate the moisture adsorption material, the heated dry purge gas preferably having a temperature ranging from about 50° C. to about 150° C. Thus in this embodiment the adsorption mode and the regeneration mode occur in sequential order, preferably in cyclic fashion.

In all methods of the invention the product fluid is reduced in moisture content by 50 percent, more preferably 80 percent, more preferably more than 99 percent of its original moisture content. Preferred methods utilize two or more moisture removal units of the first aspect of the invention in parallel. In embodiments where the dry purge gas is heated, all units operate in adsorption mode and regeneration mode at the same time. When the second method is used, all or a portion of the moisture separation units operate first in adsorption mode, then those that were in adsorption mode are switched to regeneration mode, and those that were in regeneration mode are switched to adsorption mode.

Another moisture removal method of the invention utilizes the two unit arrangement of the second apparatus embodiment, as discussed herein. This method is useful in converting a fluid having greater than 1000 ppm moisture into to useable product having less than 100 ppm moisture, preferably less than 10 ppm moisture, more preferably less than 1 ppm moisture or less.

Further aspects and advantages of the invention will become apparent by reviewing the description of preferred embodiments that follows.

DESCRIPTION OF PREFERRED EMBODIMENTS

The phrase "thermally regenerable", as used herein when referring to a composition or surface, means a material that is capable of adsorbing an acceptable amount of moisture for an acceptable period of time, and which can release adsorbed moisture through the application of heat.

The phrase "membrane" means a material that exhibits a difference in permeability between a gas value of interest, such as an electronic specialty gas, and moisture, with moisture permeating more quickly through the material than the other species.

The terms "dry" and "wet" are used in relative sense, and are not meant to be exact in terms of water or moisture content. For example, dry purge gas means the purge gas has an acceptably low moisture content to provide a sufficient driving force to accept moisture that has permeated through a membrane material. A wet purge gas is any purge gas having more moisture than its dry counterpart.

As used herein the term "modular" means that preferred apparatus of the invention are constructed in standardized units and dimensions for flexibility and variety in use.

The present invention relates to apparatus and methods for separation of moisture from fluids using a thermally regenerable material.

Figure 1:
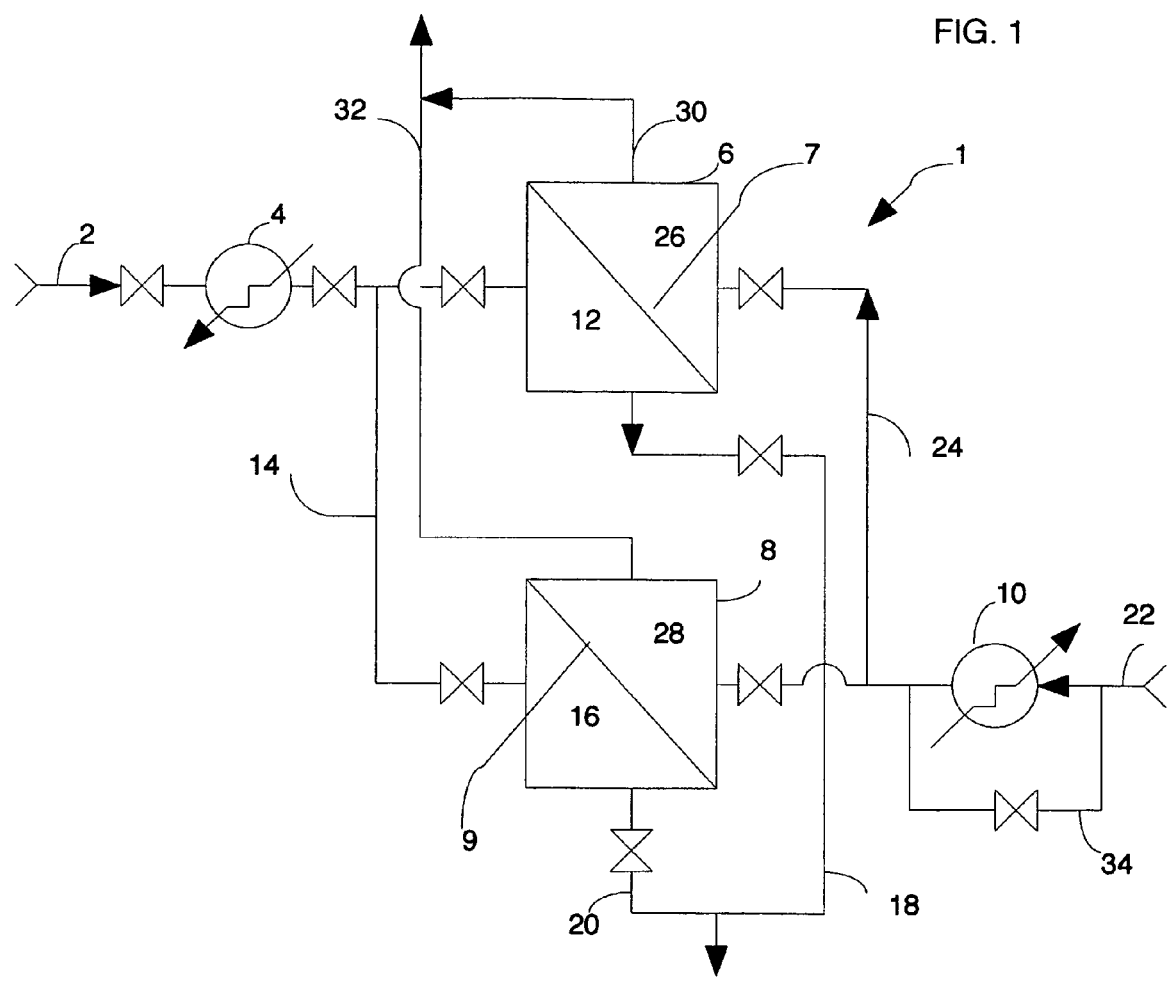
FIG. 1 illustrates schematically a block diagram of a first method and apparatus embodiment of the invention.

Referring to FIG. 1, there is illustrated at 1 schematically in block diagram fashion a moisture separation apparatus and method which might appear in a commercial semiconductor fabrication facility, and which will serve to illustrate different aspects of the invention. Conduit 2 routes a feed fluid to a chiller unit 4, which is optional depending on the temperature of the feed fluid, and then to a membrane unit 6 having a thermally regenerable adsorbent membrane 7. A second membrane unit 8 having a thermally regenerable adsorbent membrane 9 may be utilized, either alone when membrane 6 is not used, or simultaneously in parallel with membrane 6, and would be fed by a conduit 14. Suitable valving is illustrated in FIG. 1 for using one or more membrane units, as would be apparent to those of skill in the art, and for this reason are not numbered. For parallel operation, n membrane units 8, may be utilized, where n ranges from 1 up to the economical limit for a particular plant, which depends on the amount and type of fluid being treated, membrane unit cost of materials, membrane area, floor or outdoor space, and other similar considerations. A practical upper limit for n may be 10, although the invention is not limited in the number of membrane units that may be utilized in parallel. Membrane 8 is not necessary for all applications, and one unit may be sufficient or desired, as will be explained herein.

Membrane units 6 and 8 each have non-permeate (product) sides, as well as permeate (waste) sides. Membrane unit 6 has a non-permeate side 12 and a permeate side 26. Similarly, membrane unit 8 has a non-permeate side 16 and a permeate side 28. Fluidly connected to the respective permeate sides are means to accept dry purge gas, such as conduit 22. The dry purge gas may pass through a heater 10, depending on the mode of operation. When it is desired to both remove moisture from a feed gas and continuously regenerate the thermally regenerable adsorption material 7, purge gas preferably flows through conduit 22, heater 10, conduit 24, and through non-permeate side 26 of membrane unit 6, and not through conduit 34. Similarly, when it is desired to both remove moisture from a feed gas and continuously regenerate the thermally regenerable adsorption material 9, purge gas preferably flows through conduit 22, heater 10, and through non-permeate side 28 of membrane unit 8, and not through conduit 34. Units 6 and 8 may both operate simultaneously in this fashion in parallel. In alternative methods, one or both membrane units 6 and 8 may operate in adsorption mode, while dry, non-heated purge gas flows through conduits 22, 34, 24 and non-permeate sides 26 and 28, and not through heater 10. Once the thermally regenerable adsorption material is laden with moisture, or after a given period of time, feed fluid is stopped and the dry purge gas is heated by heater 10 and flows through permeate sides 26 and/or 28 to thermally regenerate the thermally regenerable adsorption material 7 and/or 9. In all methods, after the dry purge gas picks up moisture, wet purge gas may be routed via conduits 30 and/or 32 to a purge gas recovery unit, not illustrated, where wet purge gas may be dehydrated to form dry purge gas. Alternatively, wet purge gas may simply be discarded. Product fluid having significantly less moisture than feed fluid exits the apparatus through conduits 18 and 20.

Apparatus such as illustrated in FIG. 1 are particularly appropriate for removing moisture from feed fluids having less than about 1000 parts per million (ppm) water vapor, although feed fluids having higher moisture content may be processed. Once membrane 7 is substantially loaded with moisture, as measured either by time or by moisture content of the product fluid exiting through conduits 18 and/or 20, feed fluid is either stopped completely, or routed to a standby membrane unit 8, assuming membrane unit 8 has not been operated in parallel. For single membrane unit operation, feed fluid flow through conduit 2 is stopped, and thermally regenerable membrane 7 is regenerated by heated dry purge gas as follows. Dry purge gas is routed through conduit 22 to heater 10, and subsequently through conduit 24 to permeate side 26 of membrane unit 6. Heated dry purge gas flows past membrane 7, and since the heated dry purge gas is much dryer than membrane 7, moisture that has permeated or otherwise traversed through membrane 7 is mass transferred into the flowing heated dry purge gas. When the moisture content of the heated dry purge gas leaving membrane unit 6 through conduit 30 approaches the moisture content of heated dry purge gas leaving heater 10 in conduit 22, heater 10 is dialed down or completely turned off, and dry purge gas is re-routed through heater bypass conduit 34, conduit 24, and permeate side 26 of membrane unit 6. Feed fluid is also restarted through conduit 2, chiller unit 4 if desired, and through non-permeate side of membrane unit 6. If two or more membrane units are operated in parallel, operation in adsorption mode continues for a set time period or until all membranes are substantially loaded with moisture, then feed to all membrane units is stopped, and heated dry purge gas is routed to the permeate side of each membrane unit to regenerate each membrane substantially simultaneously.

In operation of the apparatus of FIG. 1, the temperatures, pressures, flow rates and moisture contents of the various streams, as well as the material and area of the membrane materials are all interrelated, as is known to the skilled artisan. Larger installed cost, usually in terms of larger membrane areas, more efficient moisture removal materials, or combination of these considerations, is offset positively by higher operating efficiency of the membrane units. It is largely a matter of choice and budget on whether a user will settle for shorter adsorption runs using less efficient moisture removal membranes and smaller membranes areas. In geographic regions where natural gas is inexpensive, for example, it may be more economical to install a membrane unit using a membrane material of average moisture removal efficiency and a membrane area sufficient to provide a set time period between regeneration cycles. In other words, one may not care if the heater is used to heat dry purge gas more often than with a more expensive membrane material. Others may prefer not to run the heater so often, if for example the heat is provided by an electric heater, which is relatively more expensive than natural gas. In general, the fluid to be dehydrated is preferably cooled to a temperature just above that which will freeze moisture in the equipment. Preferably the temperature of the fluid exiting chiller 4 ranges from about −40° C. to about 40° C., more typically from about 10° C. to about 40° C. More cooling (lower temperature) dictates higher cost, but there is then less of a load on the downstream membrane unit(s), so the membrane area may be reduced. The dry purge gas entering the membrane units during adsorption mode is typically the same temperature as the feed fluid entering the membrane units; it may be lower or higher than the feed fluid, however, it is desired that the dry purge gas be anywhere from slightly greater in temperature, to much greater in temperature than the feed fluid. In numerical terms, it is preferred that the dry purge gas have a temperature entering the membrane unit ranging from the temperature of the feed fluid entering the membrane unit to a temperature of 20° C. higher, more preferably 50° C. higher than the temperature of the feed fluid entering the membrane unit. Higher temperatures will in most cases be more expensive to obtain, and one must also consider the temperature limitations of the various materials, not the least of which being the membrane materials. In general the pressure of the purge gas is less than that of the feed fluid in the membrane units during adsorption mode, and more typically close to the atmospheric pressure. There is a trade-off here, as higher pressure differentials across the membrane during adsorption mode (higher pressure on the non-permeate side) will normally result in more moisture removal, however, there is at least the potential for more of the valuable product gas transporting through the membrane to the permeate side as well. Pressure on the non-permeate side during adsorption mode generally ranges from about just above atmospheric pressure up to several atmospheres, perhaps 5 atmospheres, while pressure on the permeate side during adsorption mode may actually be partial vacuum, but normally is close to atmospheric pressure. Specific membrane areas used are generally computed based on the expected feed moisture content, feed flow rate expected, temperature and pressure of the feed and purge streams, moisture content desired in the product stream, and flow rate desired for the product stream. Generally, for a given feed flow rate and moisture content, as the desired flow rate of product increases, and the desired moisture content for the product stream decreases, membrane area must increase. Temperature and pressure effects on the particular membrane materials selected will then typically be known.

Figure 2:
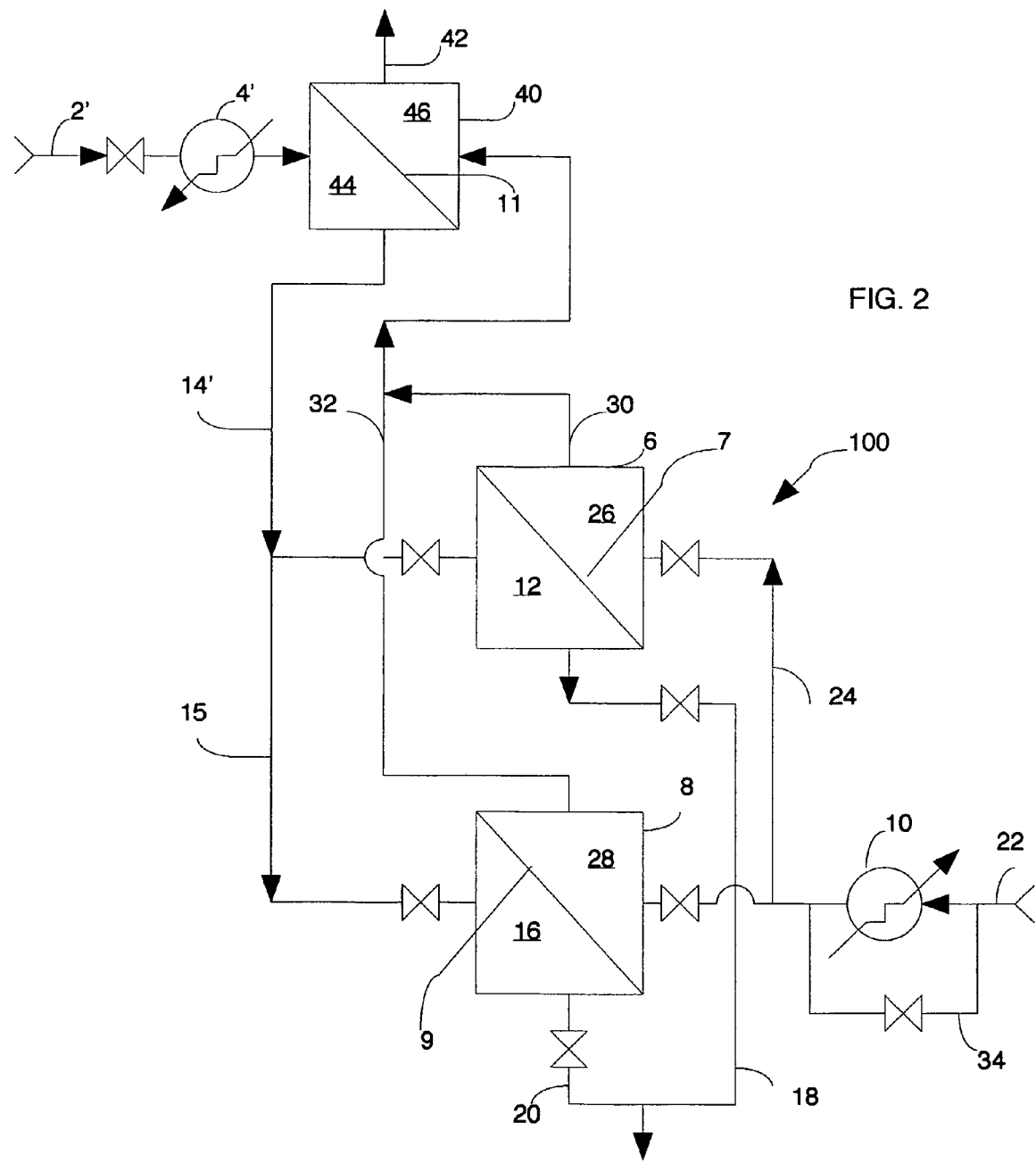
FIG. 2 illustrates schematically a block diagram of a second method and apparatus embodiment of the invention.

FIG. 2 illustrates schematically a second embodiment of the invention, 100, which is particularly useful when the feed fluid has 1000 ppm moisture or greater. Embodiment 100 includes a feed fluid inlet conduit 2', an optional feed fluid chiller 4', and a first moisture separation unit 40 having feed side 44 and waste side 46, separated by a moisture adsorption material 11. Moisture adsorption material 11 may be thermally regenerable or not thermally regenerable. In one embodiment, moisture adsorption material 11 is not thermally regenerable, and may be selected from organic and inorganic membrane materials, and may take any known form of membrane, such as flat sheet, pleated sheet, tubular, and the like. The remainder of embodiment 100 has already been described in reference to FIG. 1. Conduits 14' and 15 connect feed side 44 of moisture separation unit 40 to moisture removal units 6 and 8, which each comprise a thermally regenerable moisture removal material as already described. One of units 6 and 8 may be in simultaneous adsorption mode/thermal regeneration mode, or one may be in adsorption mode while the other is in regeneration mode, or both may be in adsorption mode simultaneously, and then regenerated simultaneously. It will be understood that embodiment 100 produces an intermediate product fluid (traversing conduits 14' and 15) having less moisture than the feed fluid, and also utilizes a dry purge gas which picks up moisture in units 6 and 8 first to form a secondary purge gas (traversing conduits 30 and 32) having more moisture than the dry purge gas, and ultimately forming a wet purge gas traversing conduit 42. Wet purge gas may be sent to a purge gas recycling center, or discarded. Dry purge gas may also be routed directly from conduit 24 to conduit 32, if desired, through an optional conduit (not shown).

The embodiment of FIG. 2 allows flexibility in designing the moisture removal apparatus. For example, a relatively inexpensive and inefficient first moisture adsorption material 11 might be employed in moisture separation unit 40, but installed with higher area to achieve a first reduction in moisture in the feed fluid, preferably down to 1000 ppm or less moisture content in the intermediate product. A more efficient, and most likely more expensive, moisture adsorption material may be employed in units 6 and 8, but the area of the material may be less than if the material were used to contact the original high moisture feed fluid having greater than 1000 ppm moisture. Also, less heat to regenerate these materials is necessary if they are smaller in area.

The apparatus and methods of the invention may employ any of the known module configurations, such as flat sheet, hollow fiber, tubular, spiral wound, and vortex devices (also known as "rotating" devices). Other useful configurations include pleated sheet and tube ribbon form. The first and second moisture separation units 40, 6, and 8 may be the same or different in configuration. For example, first moisture adsorption unit 40 might be a flat sheet membrane unit, while units 6 and 8 might comprise a plurality of hollow fiber membrane units, or vice versa. Membrane tubes and tube ribbons are disclosed in U.S. Pat. No. 5,565,166, which is incorporated herein by reference. It is also acceptable to use either "dead end" or "cross flow" modes on one or more of the moisture separation units, although cross flow mode is generally preferred. "Dead end" mode means admitting all feed fluid to a single inlet port on the feed side of the moisture separation unit. Hence the feed fluid effectively flows into a chamber dead ended by the moisture adsorption material. In contrast, "cross flow" means providing a second port on the feed side of the unit for discharge of moisture-reduced feed. The inlet and discharge ports are preferably positioned to provide a flow across the surface of the feed side of the adsorption material. Examples of tubular membranes, which may be preferred as easier to purge than hollow fiber or other membrane configurations, are those described in U.S. Pat. Nos. 4,707,261 and 4,747,946, incorporated herein by reference. The membranes described in these patents are parallel-flow tubular membrane ultrafiltration modules comprising an outer cylinder of a given length, and a plurality of water permeable non-woven fabric pipes each having a permeable membrane formed on the inside thereof and having substantially the same length as the given length of the outer cylinder. The non-woven fabric pipes are composed of polyesters, polyethylenes, polypropylenes or polyamides.

The materials selected for both thermally regenerable and non-thermally regenerable moisture adsorption materials should have numerous attributes that render the materials suitable for moisture removal service, such as structural integrity to withstand the pressure gradients during both adsorption mode and purge mode, and chemical resistance to attack or dissolution by the dehydrated species, and other chemicals designed to minimize organic and inorganic fouling of the membrane. The materials should also have the ability to be fabricated readily into the preselected membrane shape for a particular application. Since during purging the pressure may be higher on the waste side than on the feed side, the materials should be able to withstand frequent cycling between adsorption mode and purge mode. If the material is a composite membrane material, this requires a good bond between the membrane material and its support fabric, typically a non-woven material.

Media useful in the invention for the thermally regenerable materials are those able to withstand contact with moisture, reactive gases, and purge gases and are preferably thermally regenerable organic polymeric membranes or thermally regenerable inorganic membranes depending on the material performing the separation function. It is understood that an inorganic membrane might comprise organic materials, and vice versa. The thermally regenerable moisture removal materials 7 and 9 may be the same or different, as long as they both satisfy the functions of adsorbing moisture and being thermally regenerable. The moisture adsorption material 11 may also be thermally regenerable, but not thermally regenerated in the methods of the invention. The thermally regenerable materials are most preferably thermally regenerable polymeric membrane materials, preferably fluorine substituted polymer such as polytetrafluoroethylene and poly(tetrafluoroethylene-perfluoropropylvinylether); polyetheretherketone; polyacrylonitrile, polytetrafluoroethylene sulphonic acid polymeric membranes, such as available from E.I. du Pont de Nemours under the trade name "Nafion".

The feed fluid temperature, pressure, and flow rate to the first moisture separation unit 40 may vary widely, and will depend on the source of the feed fluid. The optional chiller unit 4' may be required to reduce the temperature of the feed fluid to a temperature that is safe for contacting the moisture adsorption material, if the moisture adsorption material is a type of polymer for example that is heat sensitive. Optional feed conditioning units, such as filtration units, wet or dry scrubbers, and the like, may also be required depending on the exact nature of the feed fluid and the material used in unit 40.

The flow rate of the feed fluid entering unit 40 will be limited somewhat by the capacity of downstream units 6 and 8, although if the feed fluid has a moisture content that varies, and is during some time periods not much greater than 1000 ppm, it may be desirable or beneficial to bypass unit 40 and feed the fluid directly into units 6 and/or 8. This will also depend on the condition of materials 11, 7 and 9, as well as the flow and quality of purge gas available.

The moisture adsorption material 11 in moisture separation unit 40 is preferably a membrane material, either organic or inorganic. Membranes useful in the invention for moisture adsorption material 11 may be thermally regenerable materials; glassy polymeric membranes, such as polymer membranes made preferably from polyimides, polyamides, polyamide-imides, polyesters, polycarbonates, polysulfones, polyethersulfones, polyetherimide, polyacrylonitrile, polyvinylidenefluoride, polyetherketone, alkyl substituted aromatic polyesters, blends of polyethersulfone, aromatic polyimides, aromatic polyamides, polyamidesimides, fluorinated aromatic polyimide, polyamide and polyamide-imides, polyphosphazine; cellulosic polymers, such as regenerable cellulose polymer, cellulose diacetate polymer, cellulose triacetate polymer, cellulose nitrate polymer, and blends thereof; polyurethane; polyacrylate and polyalkyl methacrylate, such as polymethyl methacrylate; polyolefin, such as polyethylene and polypropylene; saturated and unsaturated polyvinyls, such as polyvinyl chloride, polyvinyl fluoride, polyvinylidene chloride, polyvinylidene fluoride; polyvinyl alcohol; copolymers thereof, substituted polymers (e.g. alkyl, aryl) thereof and the like. Representative inorganic substrate compositions include zirconia, alumina, titanium dioxide, and $BaTiO_3$ based microporous media and the like. Asymmetric membranes are prepared by the precipitation of polymer solutions in solvent-miscible nonsolvents. Such membranes are typified by a dense separating layer supported on an anisotropic substrate of a graded porosity and are generally prepared in one step. Examples of such membranes and their methods of manufacture are disclosed in U.S. Pat. Nos. 4,113,628; 4,378,324; 4,460,526; 4,474,662; 4,485,056; 4,512,893, 5,085,676, and 4,717,394 all incorporated herein by reference. The '394 and '676 patents disclose preparation of asymmetric separation membranes from selected polyimides. Particularly preferred membranes are polyimide asymmetric gas separation membranes as disclosed in the '676 patent.

Composite gas separation membranes may also be used as the moisture adsorption material 11. Composite gas separation membranes typically have a dense separating layer on a preformed microporous substrate. The separating layer and the substrate are usually different in composition. Composite gas separation membranes have evolved to a structure of an ultrathin, dense separating layer supported on an anisotropic, microporous substrate. These composite membrane structures can be prepared by laminating a preformed ultrathin dense separating layer on top of a preformed anisotropic support membrane. Examples of such membranes and their methods of manufacture are disclosed in U.S. Pat. Nos. 4,664,669; 4,689,267; 4,741,829; 2,947,687; 2,953,502; 3,616,607; 4,714,481; 4,602,922; 2,970,106; 2,960,462; 4,713,292, 4,086,310; 4,132,824; 4,192,824; 4,155,793; and 4,156,597, all incorporated herein by reference. Alternatively, composite gas separation membranes may be prepared by multistep fabrication processes, wherein first an anisotropic, porous substrate is formed, followed by contacting the substrate with a membrane-forming solution. Examples of such methods are described in U.S. Pat. Nos. 4,826,599; 3,648,845; and 3,508,994, all incorporated herein by reference. U.S. Pat. No. 4,756,932 describes how composite hollow-fiber membranes may also be prepared by co-extrusion of multiple polymer solution layers, followed by precipitation in a solvent-miscible nonsolvent. According to one embodiment of the present invention, the membrane can be post-treated with, or coated by, or coextruded with, a fluorinated or perfluorinated polymer layer in order to increase its ability to withstand harmful constituents in the gas mixture from which PFCs are to be separated, at low levels or temporary contact with such components. The hollow-fiber spinning process depends on many variables which may affect the morphology and properties of the hollow-fiber membrane. These variables include the composition of the polymer solution employed to form the fiber, the composition of fluid injected into the bore of the hollow-fiber extrudate during spinning, the temperature of the spinneret, the coagulation medium employed to treat the hollow-fiber extrudate, the temperature of the coagulation medium, the rapidity of coagulation of the polymer, the rate of extrusion of the fiber, takeup speed of the fiber onto the takeup roll, and the like.

Fluid flow rate for the feed fluid in the apparatus and methods of the invention may range from about 1 standard cubic centimeter per minute (sccm) up to flows exceeding tens of standard liters per minute (slpm). Higher flow rates may require having multiple inlets and outlets on the feed side to ensure proper distribution of feed to the moisture adsorption material.

The product fluid from the apparatus and methods of the invention may be routed to storage or directly to an end use. In the case of semiconductor and flat panel display fabrication, the product fluid may be fed to any of a number of tools used in these arts. The semiconductor fabrication tool may be selected from etching tools including oxide, metal and dielectric; deposition tools including silicon CVD; tungsten back-etching, and dry chamber cleaning of any of these tools.

Although the foregoing description is intended to be representative of the invention, it is not intended to in any way limit the scope of the appended claims.

What is claimed is:

1. A method of removing moisture from a feed fluid, the method comprising:
    providing at least one moisture separation unit including a feed fluid inlet, a product outlet, a dry purge gas inlet, a thermally regenerated moisture adsorption membrane having a feed side and a waste side, a first passage on the feed side of the adsorption material, and a second passage on the waste side of the adsorption membrane;
    flowing the feed fluid that has been chilled into the first passage of the moisture separation unit so that the feed fluid contacts the feed side of the adsorption membrane;
    flowing dry purge gas into the second passage of the moisture separation unit so that the dry purge gas contacts the waste side of the adsorption membrane so that moisture is transferred to the dry purge gas;
    stopping the flow of the feed fluid after a predetermined time period or after the adsorption membrane is substantially loaded with moisture;
    heating the dry purge gas prior to flowing the dry purge gas into the second passage of the moisture separation unit; and
    flowing the heated dry purge gas past the waste side of the adsorption membrane to regenerate the adsorption membrane.

2. The method of claim 1 wherein the dry purge gas has a temperature substantially equal to a temperature of the feed fluid.

3. The method of claim 1 wherein the dry purge gas has a temperature that is at least 20° C. higher than a temperature of the feed fluid.

4. The method of claim 3 wherein the dry purge gas has a temperature that is at least 50° C. higher than a temperature of the feed fluid.

5. The method of claim 1 wherein the heated purge dry purge gas has temperature in the range of 50° C. to 150° C.

6. The method of claim 1 wherein the feed fluid is chilled to a temperature in the range of −40° C. to 40° C.

7. The method of claim 6 wherein the feed fluid is chilled to a temperature in the range of 10° C. to 40° C.

8. The method of claim 1 wherein a plurality of moisture separation units are provided, each moisture separation unit being identical and fluidly connected in parallel.

9. The method of claim 1 wherein the moisture content of the feed fluid is reduced by at least 50 percent.

10. The method of claim 1 wherein the moisture content of the feed fluid is reduced by at least 80 percent.

11. The method of claim 1 wherein the moisture content of the feed fluid is reduced by at least 95 percent.

12. The method of claim 1 wherein the flow of feed fluid is in the range of 1 sccm to 3 slpm.

13. The method of claim 1 wherein the flow of feed fluid is greater than 3 slpm.

14. A method of removing moisture from a feed fluid, the method comprising:
    providing at least one moisture separation unit including a feed fluid inlet, a product outlet, a dry purge gas inlet, a thermally regenerated moisture adsorption material having a feed side and a waste side, a first passage on the feed side of the adsorption material, and a second passage on the waste side of the adsorption material;
    flowing the feed fluid into the first passage of the moisture separation unit so that the feed fluid contacts the feed side of the adsorption material; flowing dry purge gas into the second passage of the moisture separation unit so that the dry purge gas contacts the waste side of the adsorption material so that moisture is transferred to the dry purge gas;
    stopping the flow of the feed fluid after a predetermined time period or after the adsorption material is substantially loaded with moisture;
    heating the dry purge gas prior to flowing the dry purge gas into the second passage of the moisture separation unit; and
    flowing the heated dry purge gas past the waste side of the adsorption material to regenerate the adsorption material;
    wherein pressure on the feed side of the adsorption material during flow of the feed fluid is in the range of atmospheric to 5 atmospheres, and pressure on the waste side of the adsorption material during flow of the feed fluid is partial vacuum.

15. A method of removing moisture from a feed fluid, the method comprising:
    providing at least one moisture separation unit including a feed fluid inlet, a product outlet, a dry purge gas inlet, a thermally regenerated moisture adsorption material having a feed side and a waste side, a first passage on the feed side of the adsorption material, and a second passage on the waste side of the adsorption material;
    flowing the feed fluid into the first passage of the moisture separation unit so that the feed fluid contacts the feed side of the adsorption material; flowing dry purge gas into the second passage of the moisture separation unit so that the dry purge gas contacts the waste side of the adsorption material so that moisture is transferred to the dry purge gas;

stopping the flow of the feed fluid after a predetermined time period or after the adsorption material is substantially loaded with moisture;

heating the dry purge gas prior to flowing the dry purge gas into the second passage of the moisture separation unit; and flowing the heated dry purge gas past the waste side of the adsorption material to regenerate the adsorption material;

wherein during flow of the feed fluid, pressure on the waste side of the adsorption material is about 0.5 atmosphere less than the pressure on the feed side of the adsorption material.

16. A method of making a gaseous product having a moisture content of no more than 100 ppm, the method comprising:

providing a first moisture separation unit having a moisture adsorption material including a feed side and a waste side;

contacting a feed fluid having a moisture content of at least 1000 ppm with the feed side of the moisture adsorption material to produce an intermediate product fluid having a reduced moisture content relative to the feed fluid;

contacting the waste side of the moisture adsorption material with a secondary purge gas to produce a wet purge gas having a higher moisture content than the secondary purge gas;

providing at least one second moisture separation unit having a thermally regenerated moisture adsorption membrane including a feed side and a waste side;

contacting the intermediate product fluid with the feed side of the thermally regenerated moisture adsorption membrane to produce a product fluid having a moisture content less than 100 ppm; and thermally regenerating the thermally regenerated moisture adsorption membrane by flowing a dry purge gas past the waste side of the thermally regenerated moisture adsorption membrane to produce the secondary purge gas having a higher moisture content than the dry purge gas.

17. The method of claim 16 wherein a plurality of second moisture separation units are provided and connected to the first moisture separation unit in parallel.

18. The method of claim 17 wherein at least one second moisture separation unit operates in adsorption mode and at least one second moisture separation unit operates in regeneration mode.

19. The method of claim 17 wherein the number at second moisture separation units is in the range of 2 to 10.

20. The method of claim 17 wherein all of the second moisture separation units operate simultaneously in adsorption mode.

21. The method of claim 16 wherein the dry purge gas is heated flowing past the second moisture adsorption material.

22. The method of claim 16 wherein the feed fluid is chilled prior to contacting the first moisture adsorption material.

23. The method of claim 16 wherein the product fluid has a moisture content less than 10 ppm.

24. The method of claim 16 wherein the product fluid has a moisture content less than 1 ppm.

25. The method of claim 16 further comprising feeding the product fluid to a semiconductor tool.

26. An apparatus useful for separation of moisture from a feed fluid, the apparatus comprising:

a feed fluid source;

a dry purge gas source; and at least one moisture separation unit comprising a feed fluid inlet fluidly connected to the feed fluid source, a product outlet, a dry purge gas inlet fluidly connected to the dry purge gas source, a thermally regenerated moisture adsorption material, comprising a membrane, having a feed side and a waste side, a first passage for allowing the feed fluid to contact the feed side of the adsorption material, and a second passage for allowing the dry purge gas to contact and flow past the waste side of the adsorption material.

27. The apparatus of claim 26 wherein the apparatus is modular.

28. The apparatus of claim 26 wherein the apparatus is portable.

29. The apparatus of claim 26 wherein the membrane is selected from the group consisting of organic membranes and inorganic membranes.

30. The apparatus of claim 29 wherein the membrane is a polymeric membrane.

31. The apparatus of claim 29 wherein the membrane is selected from the group consisting of zirconia, alumina, titanium dioxide, $BaTiO_3$, and combinations thereof.

32. The apparatus of claim 26 herein the membrane is selected from the group consisting of polytetrafluoroethylene, poly(tetrafluoroethylene-perfluoropropylvinylether), polyetheretherketone, polyacrylonitrile, and polyfluoroethylene sulphonic acid polymers.

33. The apparatus of claim 26 herein the feed side of the membrane is a non-permeate side and the waste side of the membrane is a permeate side.

34. The apparatus of claim 26 wherein the moisture adsorption unit is adapted to operate alternatively in a moisture adsorption mode and a regeneration mode.

35. The apparatus of claim 26 comprising n moisture separation units all fluidly connected in parallel to receive feed fluid on the feed side and each fluidly connected to receive dry purge gas on the waste side, wherein n is in the range of 2 to 10.

36. The apparatus of claim 35 including operating means to allow at least one moisture separation unit to operate in adsorption mode and at least one moisture separation unit to operate in regeneration mode.

37. The apparatus of claim 36 wherein said operating means comprise valves.

38. The apparatus of claim 26 wherein the membrane has a form selected from the group consisting of flat sheet, hollow fiber, tubular, spiral wound, vortex, pleated sheet and tube ribbon form.

39. The apparatus of claim 26 wherein the membrane comprises a plurality of membranes of one or more polymeric materials, wherein individual polymers may be the same or different in form, composition, diameter, and orientation.

40. The apparatus of claim 26 further including means for heating the dry purge gas.

41. The apparatus of claim 26 wherein the feed fluid inlet and product outlet are on the same side.

42. A moisture removal apparatus comprising:

a feed fluid source;

a dry purge gas source;

a first moisture separation unit in fluid communication with the feed fluid source, the first moisture separation unit comprising
    a feed fluid inlet,
    an intermediate product fluid outlet,
    a purge gas inlet,
    a moisture adsorption material having a feed side and a waste side,
    a first passage for allowing the feed fluid to contact the feed side of the adsorption material, and
    a second passage for allowing the purge gas to contact and flow past the waste side of the adsorption material; and
a plurality of second moisture separation units fluidly connected in parallel, to receive the intermediate product fluid, wherein at least one of the second moisture separation units operates in adsorption mode and at least on of the second moisture separation units operates in regeneration mode, each second moisture separation unit comprising
    an intermediate product fluid inlet in fluid communication with the intermediate product fluid outlet of the first moisture separation unit,
    a product outlet,
    a dry purge gas inlet,
    a purge gas outlet in fluid communication with the purge gas inlet of the first moisture separation unit;
    a thermally regenerated moisture adsorption material, comprising a membrane, having a feed side and a waste side,
    a first passage for allowing the intermediate product fluid to contact the feed side of the adsorption material, and
    a second passage for allowing the dry purge gas to contact and flow past the waste side of the adsorption material.

43. The apparatus of claim 42 wherein the first moisture separation unit and the second moisture separation units are identical.

44. The apparatus of claim 42 wherein the moisture adsorption material of the first moisture separation unit comprises a non-thermally regenerable moisture adsorption material.

45. The apparatus of claim 42 wherein the intermediate product fluid has reduced moisture content relative to the feed fluid.

46. The apparatus of claim 42 wherein dry purge gas first enters the second moisture separation units operating in absorption mode and contacts the waste side of the moisture adsorption material, exits after picking up some transferred moisture, and proceeds to the waste side of the first moisture separation unit, where additional moisture is transferred to the purge gas.

47. The apparatus of claim 42 wherein the moisture removal material of the first moisture separation unit comprises a membrane selected from the group consisting of organic membranes and inorganic membranes.

48. The apparatus of claim 47 wherein the membrane is a glassy polymer material selected from the group consisting of polyimides, polyamides, polyamide-imides, polyesters, polycarbonates, polysulfones, polyethersulfones, polyetherimide, polyacrylonitrile, polyvinylidenefluoride, polyetherketone, alkyl substituted aromatic polyesters, aromatic polyimides, aromatic polyamides, fluoronated aromatic polyimide, polyphosphazine and blends thereof.

49. The apparatus of claims 47 wherein the membrane is a cellulosic polymer material selected from the group consisting of regenerated cellulose polymer, cellulose diacetate polymer, cellulose triacetate polymer, cellulose nitrate polymer and blends thereof.

50. The apparatus of claim 47 wherein the membrane is a polymer material selected from the group consisting of polyurethane, polyacrylate, polyalkyl methacrylate, polyolefin, saturated and unsaturated polyvinyls, substituted polymers and copolymers thereof.

51. The apparatus of claim 47 wherein the membrane is selected from the group consisting of zirconia, alumina, titanium dioxide and $BaTiO_3$.

52. The apparatus of claim 47 wherein the membrane is an asymmetric membrane or a composite gas separation membrane.

53. The apnaratus of claim 42 further comprising means to heat the dry purge gas.

54. The apparatus of claim 42 further comprising means to chill the feed fluid.

55. A moisture removal apparatus comprising:
a feed fluid source;
a dry purge gas source
a first moisture separation unit in fluid communication with the feed fluid source, the first moisture separation unit comprising
    a feed fluid inlet,
    an intermediate product fluid outlet,
    a purge gas inlet,
    a moisture adsorption material having a feed side and a waste side,
    a first passage for allowing the feed fluid to contact the feed side of the adsorption material, and
    a second passage for allowing the purge gas to contact and flow past the waste side of the adsorption material; and
a plurality of second moisture separating units fluidly connected in parallel to receive the intermediate product fluid wherein, all of the second moisture separation units operate in adsorption mode, each second moisture separation unit comprising
    an intermediate product fluid inlet in fluid communication with the intermediate product fluid outlet of the first moisture separation unit,
    a product outlet,
    a dry purge gas inlet,
    a purge gas outlet in fluid communication with the purge gas inlet of the first moisture separation unit:
    a thermally regenerated moisture adsorption material, comprising a membrane, having a feed side and a waste side,
    a first passage for allowing the intermediate product fluid to contact the feed side of the adsorption material, and
    a second passage for allowing the dry purge gas to contact and flow past the waste side of the adsorption material.

* * * * *